United States Patent [19]
Roberts et al.

[11] Patent Number: 5,639,400
[45] Date of Patent: Jun. 17, 1997

[54] STABILIZED STORAGE PHOSPHORS AND RADIOGRAPHIC SCREENS

[75] Inventors: Luther Craig Roberts; Barbara J. Fisher, both of Rochester, N.Y.

[73] Assignee: Eastman Kodak Company, Rochester, N.Y.

[21] Appl. No.: 656,646

[22] Filed: May 31, 1996

[51] Int. Cl.$^6$ .................. C09K 11/61; C09K 11/02; G01T 1/10
[52] U.S. Cl. .............. 252/301.36; 252/301.4 H; 250/483.1; 428/690
[58] Field of Search .............. 252/301.36, 301.4 H; 250/483.1; 428/690

[56] References Cited

U.S. PATENT DOCUMENTS

| | | | |
|---|---|---|---|
| 3,859,527 | 1/1975 | Luckey | 250/327 |
| 5,427,868 | 6/1995 | Bringley et al. | 428/691 |
| 5,464,568 | 11/1995 | Bringley et al. | 252/301.4 H |
| 5,507,976 | 4/1996 | Bringley et al. | 252/301.4 H |

*Primary Examiner*—Melissa Bonner
*Attorney, Agent, or Firm*—Carl O. Thomas

[57] ABSTRACT

A stabilized storage phosphor is disclosed intended to be exposed to X-radiation and subsequently stimulated to emit light is disclosed. The storage phosphor is the product of firing a combination of species characterized by the relationship:

$$MFX_{1-z}uM^aX^a{:}yA{:}eQ{:}tD$$

wherein M is an alkaline earth; X is selected from the group consisting of Cl and Br; $M^a$ is an alkali; $X^a$ is a halide; A is selected from the rare earths Eu, Ce, Sm and Tb; Q is selected from among metal oxides; D is selected from elements 23 to 28 of the periodic table; z is from $1\times10^{-4}$ to 1; u is from 0 to 1; y is from $1\times10^{-4}$ to 0.1; e is from 0 to 1; and t is from 0 to $10^{-2}$. The storage phosphor is stabilized against decline of photostimulated luminescence intensities by the inclusion of a monocyclic compound having a molecular weight of less than 350, exhibiting both acid and base dissociation constants of less than $10^{-5}$ at 25° C. and containing the following ring atoms:

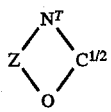

where $N^T$ represents a tertiary amine nitrogen atom, $C^{1/2}$ represents primary or secondary carbon atom, O represents an oxy linkage, and Z represents a linking group providing two ring carbon atoms to complete a five-membered ring, An oxysulfur reducing can be employed in combination. The stabilized storage phosphor is useful in storage phosphor screens used to record imagewise exposures to X-radiation.

11 Claims, No Drawings

STABILIZED STORAGE PHOSPHORS AND RADIOGRAPHIC SCREENS

FIELD OF THE INVENTION

The invention relates to storage phosphor compositions and to storage phosphor screens used to record imagewise exposures to X-radiation.

BACKGROUND

Near the beginning of the 20th century it was recognized that a medically useful anatomical image can be obtained when a film containing a radiation-sensitive silver halide emulsion is exposed to X-radiation passing through a patient. Soon thereafter it was recognized that the patient's exposure to X-radiation could be decreased by more than an order of magnitude by placing an intensifying screen adjacent the film. The intensifying screen contains a phosphor that absorbs X-radiation and promptly emits light to expose the film.

Luckey U.S. Pat. No. 3,859,527 introduced storage phosphor imaging. Luckey replaced the prompt emitting phosphor in the intensifying screen with a storage phosphor-one that absorbs X-radiation and stores its energy until subsequently stimulated to emit light imagewise as a function of the X-radiation pattern stored. Thus, the intensifying screen was replaced with a storage phosphor screen (now commonly referred to as an image storage panel), performing both the X-radiation absorption function of an intensifying screen and the image storage function previously provided by the film. This has allowed the film to be eliminated as a required imaging element.

Thereafter, routine testing of known phosphors identified those that are best suited for use as storage phosphors. Subsequent optimizations have led to selection of a storage phosphor family consisting essentially of the product of firing of a combination satisfying the relationship:

$$MFX_{1-z}\cdot uM^aX^a:yA:eQ:tD \qquad (I)$$

wherein

M is selected from the group consisting of Mg, Ca, Sr, and Ba;

X is selected from the group consisting of Cl and Br;

$M^a$ is selected from the group consisting of Na, K, Rb, and Cs;

$X^a$ is selected from the group consisting of F, Cl, Br, and I;

A is selected from the group consisting of Eu, Ce, Sm, and Tb;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;

D is selected from the group consisting of V, Cr, Mn, Fe, Co, and Ni;

z is from $1\times10^{-4}$ to 1;

u is from 0 to 1;

y is from $1\times10^{-4}$ to 0.1;

e is from 0 to 1; and t is from 0 to $10^{-2}$.

These storage phosphors are hereinafter referred to as Formula I storage phosphors.

A problem that has been encountered in use of Formula I storage phosphors is that released iodine results in reduced levels of transmitted stimulated luminescence, since the blue absorption of iodine captures a significant portion of the stimulated luminescence that would otherwise be transmitted by the phosphor. Phosphor decomposition, resulting in iodine release, has been observed to correlate with the humidity of the environment of use.

It has been proposed to employ in combination with the Formula I storage phosphors a reducing agent for released elemental iodine. The use of oxysulfur reducing agents for iodine are illustrated by Bringley et al U.S. Pat. Nos. 5,427,868, 5,464,568 and 5,507,976.

RELATED APPLICATIONS

Bringley et al U.S. Ser. No. 08/417,282, filed Apr. 5, 1995, as a continuation-in-art of U.S. Ser. No. 08/157,796 (now U.S. Pat. No. 5,427,868) and U.S. Ser. No. 08/157,797 (now abandoned), both filed Nov. 24, 1993, commonly assigned, discloses an image storage panel containing oxysulfur reducing agents for iodide both dispersed on a molecular level and as a pigment.

Bringley et al U.S. Ser. No. 08/427,380, filed Apr. 24, 1995, commonly assigned, is directed to an image storage panel containing in an amount sufficient to increase photoluminescence an organolead reducing agent for iodine.

Bringley et al U.S. Ser. No. 08/427,030, filed Apr. 24, 1995, now allowed, commonly assigned, is directed to an image storage panel containing in an amount sufficient to increase photoluminescence a metal hydride reducing agent.

Bringley et al U.S. Ser. No. 08/410,471, filed Mar. 24, 1995, now allowed, commonly assigned is directed to Formula I storage phosphor particles having a primary portion having a higher iodide content that a second portion that is exterior to and continuous with the primary portion.

SUMMARY OF THE INVENTION

The present invention is based on the discovery of a novel class of stabilizers for Formula I phosphors. Although the novel class of stabilizers can be used alone, they are not functional substitutes for the oxysulfur reducing agents. They function in a different manner than the oxysulfur reducing agents. Thus, the stabilizers of this invention can be used advantageously in combination with oxysulfur reducing agents to achieve higher levels of stability than can be realized using either class of stabilizer alone.

In one aspect the invention is directed to a stabilized storage phosphor composition comprised of (a) a storage phosphor consisting essentially of the product of firing, at a temperature from about 700° to 1300° C., a combination satisfying the relationship:

$$MFX_{1-z}\cdot uM^aX^a:yA:eQ:tD \qquad (I)$$

wherein

M is selected from the Group consisting of Mg, Ca, Sr, and Ba;

X is selected from the Group consisting of Cl and Br;

$M^a$ is selected from the Group consisting of Na, K, Rb, and Cs;

$X^a$ is selected from the Group consisting of F, Cl, Br, and I;

A is selected from the group consisting of Eu, Ce, Sm, and Tb;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;

D is selected from the group consisting of V, Cr, Mn, Fe, Co, and Ni;

z is from $1\times10^{-4}$ to 1;

u is from 0 to 1;

y is from $1\times10^{-4}$ to 0.1;

e is from 0 to 1; and t is from 0 to $10^{-2}$; and (b) a stabilizer present in an amount sufficient to reduce decline of photostimulated luminescence intensities of the storage phosphor, wherein the stabilizer is a monocyclic compound having a molecular weight of less than 350, exhibiting both acid and base dissociation constants of less than $10^{-5}$ at 25° C. and containing the following ring atoms:

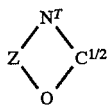

where $N^T$ represents a tertiary amine nitrogen atom, $C^{1/2}$ represents primary or secondary carbon atom, O represents an oxy linkage, and Z represents a linking group providing two ring carbon atoms to complete a five-membered ring.

DESCRIPTION OF PREFERRED EMBODIMENTS

This invention is directed an improved storage phosphor composition containing a Formula I phosphor and a stabilizer for reducing the decline in stimulated luminescent intensities that Formula I phosphors exhibit under conditions of use in image storage panels. The stabilizer is blended with the phosphor after firing, usually when the phosphor is blended with binder just before coating to form an image storage panel.

The stabilizer is a monocyclic compound having a molecular weight of less than 350, exhibiting both acid and base dissociation constants of less than $10^{-5}$ at 25° C., and containing the following ring atoms:

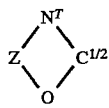

where $N^T$ represents a tertiary amine nitrogen atom, $C^{1/2}$ represents primary or secondary carbon atom, O represents an oxy linkage, and Z represents a linking group providing two ring carbon atoms to complete a five-membered ring.

These stabilizers are hereinafter also referred to as Formula II compounds or stabilizers.

The effectiveness of Formula II compounds as stabilizers results from their ability to reactively intercept HI (hydroiodic acid), which is created by moisture decomposition of the Formula I phosphor and which, once formed, accelerates decomposition of the Formula I phosphor. The Formula II compound interacts with HI in a ring-opening reaction to scavenge HI from the Formula I phosphor.

Ring opening occurs between the ring nitrogen atom and the ring carbon atom mediate the ring oxygen and nitrogen atoms—that is, the two ring position carbon atom. To facilitate ring opening the mediate carbon atom ($C^{1/2}$) is chosen to be either a primary or secondary carbon atom. A primary carbon atom is one that is bonded to one other carbon atom while a secondary carbon atom is bonded to two other carbon atoms. That is, the mediate carbon atom is itself bonded to one or two carbon atoms, which are provided by one or two substituents to the mediate carbon atom.

To insure that the Formula II ring opens readily upon contact with HI, it is essential that the Formula II compound exhibit a base dissociation constant ($K_b$) that is less than $10^{-5}$ at 25° C. To accomplish this a further required substituent to the five-membered ring is the substituent that renders the ring nitrogen atom ($N^T$) a tertiary amine nitrogen atom. A tertiary amine nitrogen atom is bonded to three different carbon atoms. This eliminates the possibility of a nitrogen-to-hydrogen (N—H) bond or an imine (N=C) bond.

No other substituents to the five-membered ring of Formula II are required. Except for the functions noted above, substituents merely add molecular bulk without contributing to the ring opening reaction with HI. It is therefore contemplated to choose substituents so that the molecular weight of the Formula II compound is less than 350. At this molecular weight limit the Formula II compound can accommodate up to 20 total carbon atoms, provided as a summed total from all ring substituents. Preferably no one substituent contains more than 12 carbon atoms. Most preferably the molecular weight of the Formula II compound is less than 250, allowing for 13 total carbon atoms, provided as a summed total from all ring substituents.

Except for the required substituent interactions with the ring nitrogen and mediate carbon atom noted above, the substituents play no role in ring opening. Thus, a wide variety of conventional oxazoline and oxazolidine ring substituents are useful.

To insure that the substituents do not reduce the ring opening reactivity of the Formula II compounds, it is necessary to choose the substituents so that they are not highly basic. Selecting Formula II compounds that exhibit a base dissociation constant of less than $10^{-5}$ at 25° C. satisfies this requirement.

On the other hand, if highly acidic substituents are chosen for the Formula II compound, the result can be excessive instability—i.e., spontaneous ring opening independent of the presence of HI. Therefore it is contemplated that the acid dissociation constant ($K_a$) of the Formula II compound measured at 25° C. also be less than $10^{-5}$.

Thus, compounds are selected satisfying Formula II that are neither highly acid nor highly basic. To put this into a familiar frame of reference, the acid dissociation constant ($K_a$) of acetic acid, a mild acid, is approximately $10^{-5}$ while the base dissociation constant ($K_b$) of ammonia, a mild base, is also approximately $10^{-5}$. It can be readily appreciated that between the acidity of acetic acid and the basicity of ammonia, a large number of neutral, slightly or mildly acid, and slightly or mildly basic substituents are available. The following types of substituents are illustrative: all hydrocarbons satisfying molecular weight requirements, including alkyl, cycloalkyl, alkenyl, alkynyl, aryl and hydrocarbons made up of moieties from two or more of these categories; halogen—i.e., fluoride, chloride, bromide and iodide; hydroxy; hydrocarbons of the type noted above linked to the five-membered ring through an oxy, carbonyl, ester (carbonyloxy), carbamoyl, amido, imino, imine, or similar acid neutral or near neutral linkage; and complex substituents made up of two or more moieties chosen from the categories of substituents noted above. Except for the required substituents, described above, all ring bonding sites can be satisfied by hydrogen.

The mediate carbon atom ($C^{1/2}$) requires one substituent linked through a carbon atom. In other words, one substituent to the mediate carbon atom is a hydrocarbon or a substituted hydrocarbon which can take any of the substituent forms noted above. The fourth bond of the mediate carbon atom can be satisfied by hydrogen or any of the substituent categories noted above.

The sole required function of Z in Formula II is to provide the two carbon atoms required to complete a five-membered ring. In the simplest contemplated form Z can be —CH$_2$—CH$_2$—. Any one or combination of these hydrogen can be replaced by any of the substituents noted above. When Z is —CH$_2$—CH$_2$— or a substituted variant, the ring is an oxazolidine ring. Alternatively, Z can be —CH$_2$=CH$_2$— or a substituted variant completing an oxazoline ring.

Based on failures of compounds containing more than one ring structure reported in the Examples below, the Formula II compounds of this invention are specifically contemplated to be monocyclic. It can be readily appreciated that when Z is chosen to include a fused benzo ring, resulting in a benzoxazoline bicyclic ring structure, the stability of the oxazoline ring is increased and ring opening is less likely to occur. On the other hand, the failures of the bicyclic and polycyclic compounds reported in the Examples cannot be correlated with increased ring stability and were not predicted. For example, polymers containing a single oxazolidine ring per repeating unit were relatively ineffective. Thus, the efficacy of the monocyclic compounds as contrasted to the failures of the bicyclic compounds tested was both surprising and unexpected.

The following are illustrations of specific Formula II stabilizers within the contemplation of the invention.
S-1 2,3-Dimethyloxazolidine
S-2 2,3-Dimethyloxazoline
S-3 3-Ethyl-2-octyloxazolidine
S-4 3-Ethyl-2-phenyloxazolidine
S-5 2,3-Di-iso-propyloxazoline
S-6 2-iso-Butyl-3-ethyl-2-methyloxazolidine
S-7 4,5-Dichloro-2,2-dimethyl-3-ethyloxazolidine
S-8 4,5-Dimethoxy-3-ethyl-2-methyloxazolidine
S-9 3-Ethyl-2-[3-(ethylcarbonyloxy)propyl)]-oxazolidine
S-10 3-n-Butyl-2-(3-heptyl)oxazolidine
S-11 4-Phenyl-2,2,3-triethylazoline
S-12 3-Decyl-2,2,4,4-tetramethyloxazolidine
S-13 4,4-Dimethyl-3-[β-(iso-butylimino)-β-methylpropyl]-2-iso-propyloxazolidine
S-14 2-(2-Hydroxyethyl)-3-n-butyloxazolidine
S-15 3-Ethyl-2-trifluoromethyloxazoline
S-16 3-[4-(Ethylamido)butyl]-2-methyloxazolidine
S-17 2,2-Dimethyl-3-ethyl-4-phenoxyoxazolidine
S-18 3-(2-ethoxyethyl)-2-n-butyloxazolidine
S-19 3-[2-(N,N-Diethylamino)ethyl]-2-iso-propyloxazolidine
S-20 2,3,4,4,-Tetramethyloxazolidine The Formula II stabilizers can be employed in combination with the Formula I phosphors in any useful concentration. Since the role of the stabilizer is to scavenge the very small quantities of HI released by phosphor decomposition, only small quantities of the stabilizer are required. For image storage panel applications concentrations ranging from 0.1 to 1 (preferably 0.25 to 0.75) percent by weight of the Formula II stabilizer, based on the weight of the Formula I phosphor, are contemplated.

In phosphor preparation the starting materials satisfying Formula I are combined and fired in the temperature range of from 700° to 1300° C. to form the phosphor in its crystalline, functional form. The Formula II stabilizer is added to the phosphor after it is formed by firing.

It is not required, but preferred, to add an oxosulfur reducing agent to the phosphor after firing. Oxosulfur reducing agents and techniques for the incorporation in the phosphor composition are disclosed by Bringley et al U.S. Pat. Nos. 5,427,868, 5,464,568 and 5,507,976, cited above, and here incorporated by reference.

The term "oxosulfur reducing agent" is used to designate oxygen and sulfur containing species capable of reducing free (molecular) iodine according to the half-reaction:

$$I_2 + 2e^- \rightarrow 2I^-$$

An oxosulfur reducing agent includes a moiety or ion of the general formula $$S_jO_k,$$

where j and k are positive integers such that the ratio j/k is, on average, defined by $$0.25 < j/k < 1.0.$$

This formula is inclusive of species in which $S_jO_k$ is a free ion and species in which $S_jO_k$ is a charge bearing moiety covalently linked to another group. The terms "oxosulfur reducing agent" and the like are similarly inclusive of both uncharged species and charged anions. Where a distinction is necessary, for example, between a salt and its dissociated ion, the proper choice is apparent from the context.

Many oxosulfur reducing agents have the general formula:

$$D_nS_jO_k$$

in which $D_n$ represents n cations chosen such that charge neutrality is obeyed. $S_jO_k$ ions of these oxosulfur reducing agents include: $SO_3^{2-}$, $S_2O_4^{2-}$, $S_2O_3^{2-}$, $S_2O_5^{2-}$, and $S_4O_6^{2-}$. $S_jO_k$ ions do not include $SO_4^{2-}$, $SO_5^{2-}$, and $S_2O_8^{2-}$, since these ions do not meet the above-indicated j/k ratio and are not reducing agents for molecular iodine. Suitable cations, also referred to herein as "counterions", are discussed in detail below.

A particular example of oxosulfur reducing agent is thiosulfate, $S_2O_3^{2-}$, such as barium thiosulfate, $BaS_2O_3$. Thiosulfate salts can be represented by the formula:

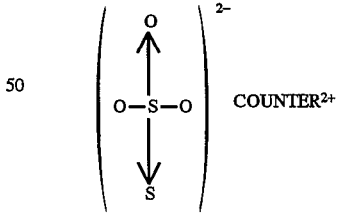

where COUNTER represents the counterion. The central sulfur atom has an oxidation number of 6+ and the outer sulfur atom has an oxidation number of 2−. Thiosulfate reacts with free (molecular) iodine in accordance with the following equation:

$$2S_2O_3^{2-} + I_2 \rightarrow S_4O_6^{2-} + 2I^-$$

In another particular embodiment of the invention, the oxosulfur reducing agent is a polythionate. Polythionate ions are often represented by the general formula:

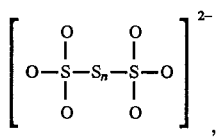

where n is from 1 to 22 or higher. The polythionate: $S_4O_6^{2-}$, which is commonly known as tetrathionate, is a product of the reaction of thiosulfate and free iodine.

Some other oxosulfur reducing agents are commonly referred to as "Bunte compounds" or "Bunte salts" and have the general structure:

$$R'SSO_3D,$$

where R' is a covalently bonded organic substituent and D is the counterion. Suitable R' groups include primary and secondary alkyl, having from 1 to 20 carbons. R' can be substituted or unsubstituted. Bunte compounds can be produced by the sulfonatothio-de-halogenation of alkyl halides with thiosulfate. Bunte compounds reduce free iodine in reaction schemes like the following:

$$R'SSO_3D + I_2 + H_2O \rightarrow R'S-SR' + DHSO_4 + HI$$

The counterion, "D", in the oxosulfur reducing agent formulas above, can be a simple inorganic cation or a complex organic or inorganic cation. Counterions can be selected on the basis of convenience and non-interference with the desired characteristics of the phosphor.

The oxosulfur reducing agent is present in the phosphor containing composition in an amount sufficient to increase relative photostimulated luminescence intensities relative to the same phosphor absent the reducing agent for iodine. Oxosulfur reducing agent concentrations of up to 0.2, preferably $2 \times 10^{-2}$, based on the weight ratio of sulfur contained in the reducing agent to alkaline earth M in the phosphor, are contemplated. Preferably, the weight ratio of sulfur, supplied by the oxosulfur reducing agent to alkaline earth M in the phosphor is at least $1 \times 10^{-4}$.

In addition to incorporating the Formula II stabilizer and the oxosulfur reducing agent in the phosphor for stabilization, it is also contemplated to incorporate either or both in starting materials forming the phosphor prior to firing to stabilize the starting materials. Neither the Formula II compound nor the reducing agent survive firing to form the phosphor. Thus, the Formula II compound and the oxosulfur reducing agent, if employed, are added to the phosphor after firing exactly as described above, regardless of whether either or both has been added to stabilize phosphor starting materials prior to firing.

When the Formula II compound and, preferably, both the Formula II compound and oxosulfur reducing agent, are added to the phosphor starting materials prior firing, it is necessary to select the compositions of the stabilizers so that they are compatible with the phosphor being produced. For example, if the phosphor is intended to include a particular alkaline earth metal, the counterion D of the oxosulfur reducing agent can be selected to provide the same element during firing. Alternatively, the counterion can be selected so as to volatilize during firing. An example of the latter is the ammonium ion.

When an oxosulfur reducing agent is used to stabilize the starting materials, the sulfur remains as a permanent part of the phosphor. Thus, Formula I is modified as follows:

$$MFX_{1-z}I_z \cdot uM^aX^a : yA : eQ : tD : dS' \quad (\text{I-A})$$

wherein

M, F, X, I, $M^a$, $X^a$, A, Q, D, z, u, y, e and t are as previously defined;

S' is the oxosulfur reducing agent; and d is chosen to provide a weight ratio sulfur to alkaline earth (M) of from 0 (preferably $1 \times 10^{-4}$) to $2 \times 10^{-2}$.

The Formula I (including I-A) phosphors and their preparation are well known in the art. Descriptions of these phosphors and their preparation are provided by Bringley et al U.S. Pat. Nos. 5,427,868, 5,464,568 and 5,507,976, cited above, and here incorporated by reference. The disclosure of Bringley et al U.S. Ser. No. 08/410,471, filed Mar. 24, 1995, now allowed, is also incorporated by reference.

In a preferred form the Formula I storage phosphor is the product of firing an intermediate, optionally containing an oxosulfur reducing agent, formed from a combination of starting materials satisfying the relationship:

$$(Ba_{1-a-b-c}Mg_aCa_bSr_c)FX_{1-z}I_z \cdot rM^aX^a : yA : eQ \quad (\text{I-B})$$

where X, $M^a$, $X^a$, A, Q, S', z, y, e and d have the same meanings as in Formulae I and the sum of a, b, and c is from 0 to 0.4, and r is from $10^{-6}$ to 0.1. In this embodiment, t in Formula I equals 0 and the term $MFX_{1-z}I_z$ in Formula I is subdivided to designate a barium fluoro halo component and an optional second alkali metal halo component. In a particular embodiment of the invention, $M^a$ in Formula I-B is potassium. When oxosulfur reducing agent is used to stabilize the starting materials, Formula I-B includes the additional term dS' as defined in Formula I-A.

Although the invention is generally applicable to any combination of a Formula I phosphor and a Formula II stabilizer, in a specifically preferred form the invention is directed to an image storage panel for use in radiographic imaging. The radiographic panels of the invention containing the Formula I phosphor and inventive stabilizer are formed by conventional coating techniques where the phosphor powders are mixed with a solution of a resin binder material and the stabilizer and coated, such as by blade coating, onto a substrate. Umemoto U.S. Pat. No. 4,505,989, the disclosure of which is here incorporated herein by reference, describes suitable techniques known in the art for preparing a storage phosphor panel.

The Formula I phosphors can be blended with other phosphors, if desired, to form a panel having optimal properties for a particular application. Panel constructions containing more than one phosphor-containing layer are also possible, with the Formula I phosphors being present in one or more of the phosphor-containing layers.

The phosphor containing layer of the panel may be overcoated with a protective layer. It is understood that both the protective layer, and the resin forming the matrix into which the phosphor particles are held are preferably formed of transparent resins that do not interfere with the passage of x-rays or stimulating radiation or the emitted light from the phosphors.

While it is in theory possible to prepare a luminescent layer that does not contain any ingredient other than the phosphor itself, in practice the luminescent layer of a panel contains in addition to phosphor particles a polymeric binder to give structural coherence to the luminescent layer. In general the binders useful in the practice of the invention are those conventionally employed in the art. Binders are generally chosen from a wide variety of known organic polymers which are transparent to x-rays, stimulating, and emitted light. Binders commonly employed in the art include sodium o-sulfobenzaldehyde acetal of poly(vinyl alcohol);

chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); linear polyesters; and poly(urethane) elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, February 1977, Item 15444, and Vol. 182, June 1979. *Research Disclosure* is published by Kenneth Mason Publications, Ltd., Emsworth, Hampshire P010 7DD, England. Particularly preferred binders are poly(urethanes), such as those commercially available under the trademark Estane from Goodrich Chemical Co., the trademark Permuthane from the Permuthane Division of ICI, and the trademark Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for panel constructions intended to withstand commercial exposure repetitions without loss of structural integrity. For limited or single exposure applications it is, of course, appreciated that any minimal amount of binder consistent with structural integrity is satisfactory.

For the highest attainable speeds a white support, such as a titania or barium sulfate loaded or coated support is employed. Particular reflective supports which offer a balance of speed and sharpness are those containing reflective microlenslets, such as are disclosed in Roberts et al U.S. Pat. No. 4,912,333. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. It is preferable, however, to include a dye or pigment which absorbs some of the stimulating radiation, generally provided by a laser; but mostly reflects emitted light. Teraoka U.S. Pat. No. 4,491,736 teaches the use of such materials in storage panel.

Apart from the phosphor layers and the assembly features described above, the panel can be of any conventional construction. Panels typically have one or more flexible or rigid support layers. Flexible layers are most commonly polymeric. The most common polymeric supports are films of high dimensional integrity, such as poly(ethylene terephthalate) film supports. In a preferred embodiment of the invention, support is provided by one or more polymeric layers and by a rigid plate of aluminum or the like.

Metal layers, such as aluminum, may enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by *Research Disclosure*, Vol. 365, September 1994, Item 36544, Section XV, and *Research Disclosure*, Vol. 184, August 1979, Item 18431, Section L.

An overcoat, though not required, is commonly located over the phosphor layer for humidity and wear protection. The overcoat can be chosen using the criteria described above for the binder. The overcoat can be chosen from among the same polymers used to form either the screen binder or the support, with the requirements of toughness and scratch resistance usually favoring polymers conventionally employed for film supports. For example, cellulose acetate is an overcoat commonly used with the poly(urethane) binders. Overcoat polymers are often used also to seal the edges of the phosphor layer. In a preferred embodiment of the invention, the overcoat is produced in accordance with a Roberts U.S. Pat. No. 5,401,971, the disclosure of which is hereby incorporated herein by reference.

While anticurl layers are not required for the panels, they are generally preferred for inclusion. The function of the anticurl layer is to balance the forces exerted by the layers coated on the opposite major surface of a support which, if left unchecked, cause the support to assume a non-planar configuration— e.g., to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

For best image definition, when the front panel support and subbing and anticurl layers are transparent, the phosphor layer either contains an absorber or overlies such a layer.

Any one or combination of conventional panel features compatible with the features described herein can, of course, be employed. Conventional storage panel constructions are disclosed in Takahashi et al U.S. Pat. No. 4,380,702, the disclosure of which is hereby incorporated by reference. Conventional intensifying panel constructions are disclosed in *Research Disclosure*, Vol. 184, August 1979, Item 18431, hereby incorporated herein by reference.

EXAMPLES

Preparation of Image Storage Panels

Image storage panels were prepared by the following general procedure: Phosphor, with or without an oxosulfur reducing agent and/or Formula II stabilizer (or a comparative compound failing to satisfy Formula II), was dispersed in a 13 percent by weight solution of PERMUTHANE U-6366™ polyurethane marketed by ICI Polyurethanes Group of West Deptford, N.J., based on the weight of the solvent, a 93:7 weight ratio dichloromethane:methanol solvent. The dispersions were milled with glass beads in a vertically-stirred open-top vessel or in a horizontal media mill. The phosphor to binder weight ratio was about 15:1. Knife-coatings were prepared on a poly(ethylene terephthalate-co-tetrafluoroethylene) film support. The knife-coatings were allowed to air-dry to produce luminescent layers. After drying, the phosphor layer of each image storage panel was overcoated with a polymer solution in acetone containing Kynar 7201™ poly(vinylidene fluoride), marketed by ELF Atochem North America, Inc. of Bloomington, Min., and Elvacite 2051™ poly(methyl methacrylate), marketed by the DuPont company of Wilmington, Del.

The relative photostimulated luminescence (PSL) intensities of the image storage panels were measured by cutting 2.6 centimeter diameter disks from the panels, and simultaneously exposing the sample and an internal standard to filtered X-radiation. The X-ray source was a tungsten target tube operating at 70 kVp and 3.0 mA. The filtration consisted of a 3.5 centimeter thickness of aluminum. After exposure to X-radiation, the samples and standard were stimulated with a 4-millisecond pulse at 633 nanometers from a 12 mW helium-neon laser. The stimulated emission was detected using a photomultiplier tube after passing through a Schott BG-25 filter. The sample PSL was normalized to the internal standard.

Oxazolidines Tested

The oxazolidines incorporated in the image storage panels were the following:

S-6
  2-iso-Butyl-3-ethyl-2-methyloxazolidine (obtained from Angus Chemical Co. of Buffalo Grove, Ill., under the trademark Zoldine MS-Plus; Chemical Abstracts registry number 143860-04-2);

S-10
  3-n-Butyl-2-(3-heptyl)oxazolidine (obtained from Industrial Copolymers Ltd. of Preston, Lancashire, England under the trademark Incozol 2; Chemical Abstracts registry number 165101-57-5)

S-13
  4,4-Dimethyl-3-[β-(iso-butylimino)-β-methylpropyl]-2-iso-propyloxazolidine (obtained from Angus Chemical Co. under the trademark Zoldine RD-4; Chemical Abstracts registry number 148348-13-4)

S-C1
  2,4-Di-iso-propyl-7-ethyloxazolidino[3,4-c]-oxazolidine (obtained from Angus Chemical Co. under the trademark Zoldine RD-20; Chemical Abstracts registry number 79815-77-6)

S-C2
  Poly[2,3-(2-ethyloxazoline)] (obtained from Aldrich Chemical Co.; Chemical Abstracts registry number 25805-17-8)

S-C3
  Bis[2-(2-iso-propyloxazolidino)ethyl] carbonate (obtained from Industrial Copolymers Ltd. under the trademark Incozol LV; Chemical Abstracts registry number 145899-78-1)

Example Set 1

This example set demonstrates the effectiveness of the monocyclic oxazolidine stabilizers of the invention as replacements for $BAS_2O_3$, a oxosulfur reducing agent known to be effective as a stabilizer. This example set further demonstrates the relatively poor performance of a bicyclic oxazoline compound.

A dispersion of $BaFBr_{0.85}I_{0.15}$:$1\times10^{-3}$ $Eu^{++}$ was prepared as indicated above and split into portions. One portion was treated by the addition of 2% $BaS_2O_3$ (here and subsequently wt. % based on wt. of phosphor, unless otherwise stated), with stirring. Each of the other portions were treated by the addition of 0.75% of an oxazolidine, with mechanical stirring. Image storage panels were prepared from each portion, as previously described. Initial PSL values were measured of the as-prepared samples. The samples were then placed in a constant humidity and temperature chamber, at 90% RH and 32° C., and the PSL was monitored periodically. The PSL speed after each time period was calculated as the ratio of the PSL after keeping to the initial PSL. Plots of the PSL speed vs. time-in-keeping were used to determine the PSL speed at specified time intervals by fitting a mathematical curve to the data points. The % PSL speed remaining after the specified time intervals was calculated from the ratio of the PSL speed estimated from the fitted curves to the estimated initial PSL speed. The % PSL speeds for various stabilizers are given in Table I.

TABLE I

| Compound | % of Initial Speed Remaining | | |
|---|---|---|---|
| Tested | Day 7 | Day 14 | Day 21 |
| 2% $BaS_2O_3$ | 96 | 87 | 75 |
| 0.75% S-13 | 94 | 91 | 90 |
| 0.75% S-C1 | 57 | 12 | 6 |
| 0.75% S-6 | 98 | 64 | 16 |
| 0.75% S-10 | 97 | 95 | 93 |

From Table I it is apparent that S-10 and S-13 offered superior stabilization of the phosphor. S-6 offered comparable stabilization for the first seven days, but then a fall off in stabilization. The bicyclic oxazolidine S-C1 demonstrated stabilization inferior to that of the other compounds tested in this set.

Example Set 2

The purpose of this example set was to demonstrate the effectiveness of the oxazolidine compounds as stabilizers when used in combination with an oxosulfur reducing agent.

Imaging storage panels were prepared and tested as in Example Set 1, except that the phosphor dispersion was prepared in the presence of 2% $BaS_2O_3$. The % PSL speeds, determined as described above, are given in Table II.

TABLE II

| 2% $BaS_2O_3$ Plus | % Initial Speed Remaining | | |
|---|---|---|---|
| Oxazolidine | Day 7 | Day 14 | Day 21 |
| No oxazolidine | 101 | 96 | 89 |
| 0.75% S-13 | 98 | 97 | 95 |
| 0.75% S-C1 | 91 | 80 | 66 |
| 0.75% S-6 | 99 | 99 | 98 |
| 0.75% S-10 | 98 | 96 | 95 |
| 0.75% S-C3 | 93 | 82 | 68 |

From Table II it is apparent that after 21 days the highest levels of photostimulated luminescence were obtained when S-6, S-10 or S-13, satisfying the oxazolidine requirements of the invention, were employed. The bicyclic oxazolidines exhibited inferior performance throughout the time period of the tests.

Example Set 3

In a separate set the comparison of Example Set 2 was repeated, but with the polymeric oxazoline S-C2 substituted. The results are summarized in Table III.

TABLE III

| 2% BaS₂O₃ Plus | % Initial Speed Remaining | | |
|---|---|---|---|
| Oxazolidine | Day 7 | Day 14 | Day 21 |
| No oxazolidine | 87 | 70 | 49 |
| 0.75% S-C3 | 87 | 69 | 48 |

From Table III it is apparent that the polymeric oxazolidine provided no increase in stability.

Example Set 4

This example set compares the stability of an image storage panel containing neither an oxazolidine nor an oxosulfur reducing agent to an image storage panel containing a monocyclic oxazolidine satisfying the requirements of the invention.

Panel preparation and stabilizer addition were undertaken by the procedures described above. The results are summarized in Table IV.

TABLE IV

| 0.75% | % Initial Speed Remaining | | |
|---|---|---|---|
| S-10 | Day 7 | Day 14 | Day 21 |
| Absent | 83 | 49 | 11 |
| Present | 97 | 93 | 89 |

From Table IV it is apparent that the monocyclic oxazolidine alone was able to significantly increase the stability of the image storage panel.

The invention has been described in detail with particular reference to preferred embodiments thereof, but it will be understood that variations and modifications can be effected within the spirit and scope of the invention.

What is claimed is:

1. A stabilized storage phosphor composition comprised of
   (a) a storage phosphor consisting essentially of the product of firing, at a temperature from about 700° to 1300° C., a combination satisfying the relationship:

$MFX_{1-z-y}uM^aX^a{:}yA{:}eQ{:}tD$ wherein
   M is selected from the group consisting of Mg, Ca, Sr, and Ba;
   X is selected from the group consisting of Cl and Br;
   $M^a$ is selected from the group consisting of Na, K, Rb, and Cs;
   $X^a$ is selected from the group consisting of F, Cl, Br, and I;
   A is selected from the group consisting of Eu, Ce, Sm, and Tb;
   Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;
   D is selected from the group consisting of V, Cr, Mn, Fe, Co, and Ni;
   z is from $1 \times 10^{-4}$ to 1;
   u is from 0 to 1;
   y is from $1 \times 10^{-4}$ to 0.1;
   e is from 0 to 1; and
   t is from 0 to $10^{-2}$; and (b) a stabilizer present in an amount sufficient to reduce decline of photostimulated luminescence intensities of the storage phosphor,
   wherein said stabilizer is a monocyclic compound having a molecular weight of less than 350, exhibiting both acid and base dissociation constants of less than $10^{-5}$ at 25° C. and containing the following ring atoms:

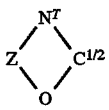

where
   $N^T$ represents a tertiary amine nitrogen atom,
   $C^{1/2}$ represents primary or secondary carbon atom,
   O represents an oxy linkage, and
   Z represents a linking group providing two ring carbon atoms to complete a five-membered ring.

2. A stabilized storage phosphor composition according to claim 1 wherein the storage phosphor consists essentially of the product of firing, at a temperature of from about 700° to 1300° C., a combination satisfying the relationship:

$(Ba_{1-a-b-c}Mg_aCa_bSr_c)FX_{1-z-y}rM^aX^a{:}yA{:}eQ$ wherein
   X, Ma, Xa, A, Q, S', z, y and e are as previously defined;
   the sum of a, b, and c is from 0 to 0.4; and
   r is from $10^{-6}$ to 0.1.

3. A stabilized storage phosphor composition according to claim 1 wherein an oxosulfur reducing agent is additionally present in the combination fired to form the phosphor.

4. A stabilized storage phosphor composition according to claim 1 wherein an oxosulfur reducing agent is additionally present in the stabilized storage phosphor composition.

5. A stabilized storage phosphor composition according to claim 1 wherein the stabilizer exhibits a molecular weight of less than 250.

6. A stabilized storage phosphor composition according to claim 1 wherein the stabilizer is present in a concentration of from 0.1 to 1.0 percent by weight, based on the weight of the phosphor.

7. A stabilized storage phosphor composition according to claim 6 wherein the stabilizer is present in a concentration of from 0.25 to 0.75 percent by weight, based on the weight of the phosphor.

8. A stabilized storage phosphor composition according to claim 1 wherein the stabilizer is chosen from among the following:
   2,3-dimethyloxazolidine,
   2,3-dimethyloxazoline,
   3-ethyl-2-phenyloxazolidine,
   2,3-di-iso-propyloxazoline,
   2-iso-butyl-3-ethyl-2-methyloxazolidine,
   4,5-dichloro-2,2-dimethyl-3-ethyloxazolidine,
   4,5-dimethoxy-3-ethyl-2-methyloxazolidine,
   3-ethyl-2-[3-(ethylcarbonyloxy)propyl)]-oxazolidine,
   3-n-butyl-2-(3-heptyl)oxazolidine,
   4-phenyl-2,2,3-triethylazoline,
   3-decyl-2,2,4,4-tetramethyloxazolidine, 4,4-dimethyl-3-[β-(iso-butylimino)-β-methylpropyl]-2-iso-propyloxazolidine,
   2-(2-hydroxyethyl)-3-n-butyloxazolidine,
   3-ethyl-2-trifluoromethyloxazoline,
   3-[4-(ethylamido)butyl]-2-methyloxazolidine,
   2,2-dimethyl-3-ethyl-4-phenoxyoxazolidine, 3-(2-ethoxyethyl)-2-n-butyloxazolidine,
3-[2-(N,N-diethylamino)ethyl]-2iso-propyloxazolidine, and
2,3,4,4,-tetramethyloxazolidine.

9. A stabilized storage phosphor composition comprised of
(a) a storage phosphor consisting essentially of the product of firing, at a temperature from about 700° to 1300° C., a combination satisfying the relationship:

$$(Ba_{1-a-b-c}Mg_aCa_bSr_c)FX_{1-z}I_z \cdot rM^aX^a : yA : eQ$$

wherein
X is selected from the group consisting of Cl and Br;
$M^a$ is selected from the group consisting of Na, K, Rb, and Cs;
$X^a$ is selected from the group consisting of F, Cl, Br, and I;
A is selected from the group consisting of Eu, Ce, Sm, and Tb;
Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;
D is selected from the group consisting of V, Cr, Mn, Fe, Co, and Ni;
the sum of a, b, and c is from 0 to 0.4;
r is from $10^{-6}$ to 0.1;
z is from $1\times10^{-4}$ to 1;
y is from $1\times10^{-4}$ to 0.1; and
e is from 0 to 1; and (b) a stabilizer present in an amount sufficient to reduce decline of photostimulated luminescence intensities of the storage phosphor,
wherein said stabilizer is present in a concentration of from 0.25 to 0.75 percent by weight, based on the weight of the phosphor, and chosen from the among the following:
2-iso-butyl-3-ethyl-2-methyloxazolidine,
3-n-butyl-2-(3-heptyl)oxazolidine, and
4,4-dimethyl-3-[β(iso-butylimino)-β-methylpropyl]-2-iso-propyloxazolidine.

10. A stabilized phosphor composition according to claim 9 additionally including in at least one of (a) the combination present before firing the phosphor or (b) the composition including the stabilizer, an oxosulfur reducing agent satisfying the relationship:

$$S_jO_k,$$

where j and k are positive integers such that the ratio j/k is, on average, defined by $$0.25 < j/k < 1.0,$$

with the weight ratio of S to alkaline earth in the phosphor ranging from $1\times10^{-4}$ to $2\times10^{-2}$.

11. An image storage panel containing a stabilized storage phosphor composition according to any one of claims 1 to 10 inclusive.

* * * * *